US007569319B2

(12) United States Patent
Uosaki et al.

(10) Patent No.: US 7,569,319 B2

(45) Date of Patent: Aug. 4, 2009

(54) BINDER RESIN FOR TONER AND ELECTROPHOTOGRAPHIC TONER FOR STATIC CHARGE IMAGE DEVELOPMENT CONTAINING THE SAME

(75) Inventors: Hirotaka Uosaki, Sodegaura (JP); Hiroyuki Takei, Sodegaura (JP); Yuji Emura, Sodegaura (JP); Hiroshi Matsuoka, Sodegaura (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 692 days.

(21) Appl. No.: 10/533,549

(22) PCT Filed: Nov. 26, 2003

(86) PCT No.: PCT/JP03/15087

§ 371 (c)(1), (2), (4) Date: May 2, 2005

(87) PCT Pub. No.: WO2004/049075

PCT Pub. Date: Jun. 10, 2004

(65) Prior Publication Data

US 2006/0078816 A1 Apr. 13, 2006

(30) Foreign Application Priority Data

Nov. 26, 2002 (JP) ............................ 2002-343088
Nov. 26, 2002 (JP) ............................ 2002-343089
Nov. 26, 2002 (JP) ............................ 2002-343090

(51) Int. Cl.
*G03G 9/087* (2006.01)
*C08G 18/06* (2006.01)

(52) U.S. Cl. .............. 430/109.4; 430/108.1; 430/108.4; 525/440.09; 525/440.12; 525/440.13

(58) Field of Classification Search .............. 430/109.4, 430/109.5, 108.4, 108.8, 108.1; 525/440.11, 525/440.12, 440.13, 440.01, 440.09, 130, 525/444

See application file for complete search history.

(56) References Cited

U.S. PATENT DOCUMENTS

| | | | | |
|---|---|---|---|---|
| 4,386,147 | A | 5/1983 | Seimiya et al. | |
| 4,486,524 | A | 12/1984 | Fujisaki et al. | |
| 4,499,168 | A | 2/1985 | Mitsuhashi | |
| 4,557,991 | A | 12/1985 | Takagiwa et al. | |
| 4,833,057 | A | 5/1989 | Misawa et al. | |
| 4,917,982 | A | 4/1990 | Tomono et al. | |
| 4,921,771 | A | 5/1990 | Tomono et al. | |
| 4,933,252 | A | 6/1990 | Nishikawa et al. | |
| 4,988,598 | A | 1/1991 | Tomono et al. | |
| 4,997,739 | A | 3/1991 | Tomono et al. | |
| 5,004,666 | A | 4/1991 | Tomono et al. | |
| 5,023,158 | A | 6/1991 | Tomono et al. | |
| 5,079,123 | A * | 1/1992 | Nanya et al. | 430/108.4 |
| 5,084,368 | A | 1/1992 | Hirayama et al. | |
| 5,629,118 | A | 5/1997 | Tomono et al. | |
| 5,629,123 | A | 5/1997 | Tomono et al. | |
| 5,928,825 | A * | 7/1999 | Eguchi et al. | 430/108.4 |
| 5,958,641 | A | 9/1999 | Sano et al. | |
| 6,335,139 | B1 | 1/2002 | Gambayashi et al. | |
| 6,733,942 | B2 | 5/2004 | Emura et al. | |
| 7,105,260 | B2 * | 9/2006 | Terauchi et al. | 430/109.1 |
| 2003/0008225 | A1 * | 1/2003 | Emura et al. | 430/109.4 |

FOREIGN PATENT DOCUMENTS

| | | | |
|---|---|---|---|
| JP | 49-65232 | A | 6/1974 |
| JP | 50-028840 | A | 3/1975 |
| JP | 50-081342 | A | 7/1975 |
| JP | 55-6895 | B2 | 2/1980 |
| JP | 59-174853 | A | 10/1984 |
| JP | 61-284771 | A | 12/1986 |
| JP | 63-291668 | A | 12/1987 |
| JP | 63-032180 | B2 | 6/1988 |
| JP | 4-226472 | A | 8/1992 |
| JP | 4-301853 | A | 10/1992 |
| JP | 6-258868 | A | 9/1994 |
| JP | 07-101318 | B2 | 11/1995 |
| JP | 10-186722 | A | 7/1998 |
| JP | 11-189647 | A | 7/1999 |
| JP | 2000-001532 | A | 1/2000 |

(Continued)

OTHER PUBLICATIONS

Derwent Abstract ACC-No: Derwent Week 20040 describing US 5958641 A, copyright 2009.*

*Primary Examiner*—Janis L Dote

(74) *Attorney, Agent, or Firm*—Buchanan Ingersoll & Rooney PC

(57) ABSTRACT

A polyester binder resin for a toner that excels in low-temperature fixing properties, offset resistance, development durability, long-term storability, electrification properties, pulverizability, etc.; and a toner containing the same. The binder resin for a toner is comprised of a polyester resin and, dispersed therein, a wax having a substituent selected from among a substituent of aromatic structure (representative example thereof is a group derived from a styrene compound), a carboxyl group and a hydroxyl group, or comprised of a polyester resin having the above wax introduced in the structure thereof. The toner containing the above binder resin for toner exhibits excellent capability in not only, as fundamental performance of toner, low-temperature fixing properties and offset resistance but also development durability, antiblocking properties and pulverizability.

2 Claims, No Drawings

FOREIGN PATENT DOCUMENTS

| | | | |
|---|---|---|---|
| JP | 2000-258953 | A | 9/2000 |
| JP | 2002-123033 | A | 4/2002 |
| KR | 2001-0050561 | | 6/2001 |
| KR | 2002-0044184 | | 6/2002 |
| WO | WO 02/21219 | A1 * | 3/2002 |

* cited by examiner

BINDER RESIN FOR TONER AND ELECTROPHOTOGRAPHIC TONER FOR STATIC CHARGE IMAGE DEVELOPMENT CONTAINING THE SAME

TECHNICAL FIELD

The present invention relates to an electrophotographic toner used for development of a static charge image in electrophotography, electrostatic printing and the like.

BACKGROUND ART

With the progress of office automation, the demand for electrophotography-based copying machines and printers has rapidly increased and performance requirements for such equipment have become higher. There is a generally used method which comprises forming an electrostatic latent image on the photo-sensitive material, then developing the image using a toner, transferring the toner image onto a fixing sheet such as paper or the like, and heat-pressing the transferred toner image using a heat roll (a heat roll fixing method). In this heat roll fixing method, in order to achieve enhanced economical efficiency in power consumption and increased photography speed, and to prevent papers from being curled, a toner superior in fixing properties is needed, which can be fixed at a lower temperature. On the other hand, there is such a problem, a so-called offset phenomenon, in the heat roll fixing method that since a toner is contacted with the surface of the heat roll in the melt state of the toner, the toner is transferred by adhering on the surface of the heat roll, and the transferred toner is transferred again on the next fixing sheet to be fixed to contaminate it. One of the important performance requirements for a toner is not to cause this offset phenomenon as well. Meanwhile, as copiers and printers have come to employ a higher speed, high performance requirements in electrified portions have also increased. That is, a higher durability is required for a toner and a longer-term stability in printing is needed.

Furthermore, in recent years, an increase in population has increased the amount of energy and has depleted resources. In connection therewith, resources saving, energy saving, recycling of resources, etc. have been claimed. As to PET bottles, individual municipalities have started a recycling activity and have started to utilize PET bottles as clothes or containers. In addition, utilization of recycled PET is highly desired.

In the conventional technique, there has been proposed a method to improve the molecular weight and molecular weight distribution of a binder resin for a toner. Concretely, it has been tested to have a binder resin of a low-molecular weight and to lower the fixing temperature. However, the melting point has been lowered owing to the lowered molecular weight whereas the cohesive force of a resin has also been deteriorated simultaneously. Therefore, an offset phenomenon occurs to the fixing roll. In order to prevent such a problem, it has been attempted to use a binder resin having a wide molecular weight distribution by mixing a high molecular weight resin and a low-molecular weight resin, or, further to crosslink the high molecular weight portion of the binder resin or the like. With this method, however, it is difficult to satisfy the fixing properties owing to the increased viscosity of the resin.

As a binder resin for a toner using the above method, in general, a styrene acrylic resin (e.g., JP1980-6895B and JP1988-32180B, U.S. Pat. No. 5,084,368, etc), a polyester resin (e.g., JP1986-284771A, JP1987-291668A, JP1995-

101318B, U.S. Pat. No. 4,833,057, etc.), or a polyol resin (e.g., JP1999-189647A, etc.) is mainly used.

However, the toners obtained by these techniques cannot be fully effective in high-speed copiers or small copiers in which the amount of heat from the heat fixing roll is not sufficiently transmitted. That is, when a polymer having a high weight-average molecular weight or a crosslinked polymer is used in order to prevent the offset phenomenon, the viscosity of a resin increases so that the fixing properties are deteriorated.

In order to achieve these requirements, there is a method to add paraffin waxes, low-molecular weight polyolefin or the like as a mold release agent to a toner. In JP1974-65232A, JP1975-28840A, JP1975-81342A or the like is disclosed a technique to use a styrene type binder resin. However, anti-blocking properties and the development properties have been deteriorated whereas an offset phenomenon has been improved. It is also confirmed that the effects of a mold release agent are small when applied to a polyester resin and the developing agent is rapidly depleted when its amount is increased.

It has also been tested to improve toner performance by employing a special wax, which has been reported in JP1984-174853A, JP1998-186722A, JP2000-1532A or the like. However, a toner having much higher performance has been required from the market.

In order to provide a developing agent having sufficient fixing properties and offset resistance, and being capable of providing high image quality of copying images, it needs to give sufficient electrophotographic features to the developing agent. Many methods have been attempted heretofore in order to achieve high image quality and high resolution of copying images; however, a toner capable of overcoming the above defects and responding to the market demand could not be obtained heretofore.

DISCLOSURE OF THE INVENTION

Accordingly, the present invention has an initial purpose of providing an electrophotographic toner for development of a static charge image development satisfying various features that are required for toners from the past. More specifically, an object of the present invention is to provide a binder resin for a toner in which an offset phenomenon is prevented without coating an offset preventive solution and which can be fixed at a lower fixing temperature in the heat roll fixing method.

Another object of the present invention is to provide a binder resin for a toner to be able to form stable development images for a long period.

A further object of the present invention is to provide a binder resin for a toner having a weight-average particle diameter of not more than 10 micro-meters while suppressing a fine powder of less than 3 micro-meters in a small amount from the viewpoint of superior durability.

A further object of the present invention is to provide an electrophotographic toner for development of a static charge image capable of realizing performance requirements as described above.

In order to solve the above problems, the present inventors have found a superior binder resin for a toner that cannot be realized by any of conventional techniques as a result of extensive review, thus completing the present invention.

That is, the present invention is specified by the matters described in the following (1) to (6).

(1) A binder resin for a toner obtained from a polyethylene terephthalate (PET) and/or a polybutylene terephthalate (PBT), a polycarboxylic acid, a polyhydric alcohol, a wax (c1) having a group selected from a substituent of aromatic structure having 6 to 750 carbon atoms, a hydroxyl group and a carboxyl group, and a polyisocyanate (d).

(2) Preferably, the binder resin for a toner, wherein the wax (c1) is a modified polyethylene wax (c3) obtained from a polyethylene wax and a styrene type compound.

(3) Preferably, the binder resin for a toner, wherein the wax (c1) is a wax (c4) having a hydroxyl group and/or a carboxyl group.

(4) Preferably, the binder resin for a toner obtained from a polyester resin (a3) satisfying the following requirement (I) and a polyisocyanate (d):

(I) The polyester resin (a3) is a polyester resin obtained from a polyethylene terephthalate (PET) and/or a polybutylene terephthalate (PBT), a polycarboxylic acid, a polyhydric alcohol, and a wax (c4) having a hydroxyl group and/or a carboxyl group.

(5) An electrophotographic toner for static charge image development comprising at least a polyester resin (a4) satisfying the following requirement (II) and a wax (c2) having a substituent of aromatic structure having 6 to 750 carbon atoms:

(II) The polyester resin (a4) is a polyester resin obtained from a polyester resin (a1) comprising a polyethylene terephthalate (PET) and/or a polybutylene terephthalate (PBT), a polycarboxylic acid and a polyhydric alcohol, and a polyisocyanate (d).

(6) An electrophotographic toner for static charge image development containing the binder resin for a toner.

The binder resin for a toner and the toner comprising the same of the present invention are superior in antiblocking properties and development durability, in addition to an offset resistance, while realizing superior low-temperature fixing properties. Thus, its industrial value is great.

BEST MODE FOR CARRYING OUT THE INVENTION

The binder resin for a toner of the present invention is a resin obtained from a polyethylene terephthalate (PET) and/or a polybutylene terephthalate (PBT), a polycarboxylic acid, a polyhydric alcohol, a wax (c1) having a group selected from a substituent of aromatic structure having 6 to 750 carbon atoms, a hydroxyl group and a carboxyl group, and a polyisocyanate (d). Components of the binder resin for a toner of the present invention are described in detail below.

(Wax (c1))

A wax which is used in the present invention is a wax (c1) having a group selected from a substituent of aromatic structure having 6 to 750 carbon atoms, a hydroxyl group and a carboxyl group.

As for the wax (c1), any known waxes can be used without limitation. Concrete examples thereof include low-molecular weight polyolefins such as polyethylene, polypropylene, polybutene and the like; silicone having a softening point by heating; aliphatic amides such as oleamide, erucamide, ricinoleamide, stearylamide and the like or natural waxes such as ceramic wax, rice wax, sugar wax, urushi wax, beeswax, carnauba wax, candelilla wax, montan wax and the like; and waxes obtained by modifiying a Fisher-Tropsch wax or the like. Any commercial waxes can be used as the low-molecular weight waxes before the modification. The above polyethylene wax, more specifically, having an ethylene-derived structure unit as a main structure unit, is a wax comprising a copolymer of ethylene and other □-olefin monomer of usually not more than 10 mole %, in addition to a homopolymer of ethylene. Herein, as other □-olefin monomers, there can be exemplified, for example, propylene, 1-butene, 1-pentene, 2-methyl-1-butene, 3-methyl-1-butene, 1-hexene, 4-methyl-1-pentene, 3-methyl-1-pentene, 2-methyl-1-pentene, 1-heptene, 4-methyl-1-hexene, 1-octene, 5-methyl-1-heptene, 1-decene or the like. Among these, polyethylene wax comprising a homopolymer of ethylene, ethylene-propylene wax, ethylene-1-butene wax, and ethylene-4-methyl-1-pentene wax are preferable. A polyethylene wax of an ethylene homopolymer is particularly preferable.

As a method of modifying the above wax, known methods can be used without limitation. Concrete examples thereof can be cited below. For example, in order to obtain a wax (c2) having a substituent of aromatic structure having 6 to 750 carbon atoms, a method of grafting the above wax with a compound of aromatic structure using a radical reaction can be cited. As the wax before grafting, an oxide of a polyethylene wax can also be used. In this case, the content of oxygen is usually within 10 weight %. Examples of the compound of aromatic structure preferably include styrene type compounds such as styrene, □-methyl styrene, halogenated styrene, vinyl toluene, 4-sulfonamide styrene, 4-styrene sulfonate and the like or polymers derived from styrene type compounds. As another method, a method of copolymerizing a macro-monomer derived from a styrene type compound with olefin can be cited. Of these methods, a method of subjecting a wax and a compound of aromatic structure to a graft reaction by radical is preferable from the viewpoints of the simplified production method, the cost and the like.

A wax (c2) of the present invention has a substituent of aromatic structure preferably in the range of 3 to 80 weight parts and more preferably in the range of 5 to 75 weight parts, based on 100 weight parts of the raw material wax. When the substituent of aromatic structure in the wax (c2) is less than 3 weight parts based on 100 weight parts of the raw material wax, a fixing roll and a photo sensitive material are easily contaminated in some cases. Furthermore, a styrene compound-derived portion exceeds 80 weight parts based on 100 weight parts of the polyethylene wax, an offset phenomenon occurs in some cases.

The number of carbon atoms of the substituent of aromatic structure for the wax (c2) is from 6 to 750, preferably from 20 to 400 and more preferably from 30 to 300.

Features of the wax (c2) of the present invention can almost be controlled by the above raw material wax. As a feature of the raw material wax, a number-average molecular weight (Mn) is preferably in the range of 400 to 2,500 and more preferably in the range of 500 to 1,700. Further, a molecular weight distribution (Mw/Mn) is preferably in the range of 1.1 to 2.2. When Mn is less than the above lower limit, due to the presence of a low-molecular weight material, storage stability in a toner is deteriorated in some cases. Further, when Mn exceeds the upper limit, due to the presence of a high molecular weight material, the minimum fixing temperature increases or an offset phenomenon occurs in some cases. Further, when Mw/Mn exceeds the above upper limit, due to the presence of a low-molecular weight material and a high molecular weight material, storage stability is deteriorated or an offset phenomenon occurs in some cases.

A more preferred wax (c2) of the present invention is a modified polyethylene wax (c3) obtained from a polyethylene wax and a styrene type compound.

Another example of the wax (c1) include a wax (c4) having a hydroxyl group and/or a carboxyl group. Any known waxes can be used without limitation. As a preferred method of preparing the wax (c4), the following methods can be cited.

A method comprising introducing a COOH group or an OH group by bringing a wax in the melt state into contact with oxygen for oxidation.

A method comprising reacting a carboxylic acid or its anhydride with a wax, preferably in the presence of a radical initiator. As the carboxylic acid, use of a carboxylic acid having double bonds such as an acrylic acid, a methacrylic acid, a maleic acid, a fumaric acid and the like or its anhydride is preferable.

A method comprising reacting a carboxylic acid ester or the like having an OH group with a wax, preferably in the presence of a radical initiator. As the carboxylic acid ester, use of a carboxylic acid ester having double bonds such as an acrylic acid ester, a methacrylic acid ester, a maleic acid ester, a fumaric acid ester and the like is preferable.

The above wax (c4) preferably comprises a plurality of carboxyl groups or OH groups contained in a molecule of a wax. Such a wax is introduced into not only a side chain, but also a skeleton of a polyester resin in preparing a polyester resin by the polycondensation or the reaction with a polyisocyanate (d) to be described below. Thus, an effect of much higher performance improvement can be expected to be exhibited.

(Polyester Resin)

The binder resin for a toner of the present invention comprises a polyester resin structure. Further, the polyester resin structure is obtained from at least PET and/or PBT, a polycarboxylic acid and a polyhydric alcohol. As a preferred method, a method comprising subjecting the components to the polycondensation reaction or the reaction in combination of depolymerization and polycondensation can be cited.

The above polyester resin structure is preferably introduced into the binder resin for a toner of the present invention by the reaction of a polyester resin (a1) obtained from at least PET and/or PBT, a polycarboxylic acid and a polyhydric alcohol with a polyisocyanate (d) to be described later. Furthermore, it is also one of preferred embodiments that, by the reaction of a polyester resin (a2) obtained from PET and/or PBT, a polycarboxylic acid, a polyhydric alcohol and the wax (c1) with a polyisocyanate (d), the above polyester resin structure is introduced into the binder resin for a toner. As the above polyester resin (a2), a polyester resin (a3) obtained by using a wax (c4) having a hydroxyl group and/or a carboxylic group as a wax (c1) is preferable.

As for the above polycarboxylic acid, there can be exemplified, for example, dicarboxylic acid and acid anhydrides thereof. It is also possible to use a monocarboxylic acid and a tri- or higher polycarboxylic acid for the purpose of molecular weight control.

As acid components of the present invention, there can be specifically mentioned, for example, alkyldicarboxylic acids such as terephthalic acid, malonic acid, succinic acid, glutaric acid, adipic acid, azelaic acid, sebacic acid and the like; unsaturated dicarboxylic acids such as maleic acid, fumaric acid, citraconic acid, itaconic acid and the like; benzene dicarboxylic acids such as phthalic acid, isophthalic acid, phthalic anhydride and the like; anhydrides of these dicarboxylic acids or lower alkyl esters. It is also possible to use a monocarboxylic acid and a tri- or higher polycarboxylic acid for the purpose of molecular weight control. As preferred monocarboxylic acids, there can be exemplified, for example, aliphatic monocarboxylic acids such as octanoic acid, decanoic acid, dodecanoic acid, myristic acid, palmitic acid, stearic acid and the like, and they may have branches or unsaturated groups. Further, these aliphatic monocarboxylic acids have an action of giving a reduced glass transition temperature; therefore, for the purpose of control of glass transition temperature, they can be used as well. To maintain the glass transition temperature or the like, an aromatic monocarboxylic acid such as benzoic acid, naphthalene carboxylic acid or the like may be used. As the polycarboxylic acid, there can be exemplified, for example, trimellitic acid, and pyromellitic acid and acid anhydrides thereof. Furthermore, it is also possible to form a polyester structure by the ester exchange reaction using the lower alkylester of the above acids.

Of the above polycarboxylic acids, terephthalic acid and isophthalic acid are preferable and terephthalic acid is particularly preferable.

As the polyhydric alcohol component, diol and a tri- or higher polyhydric alcohol component can be cited. Examples thereof include alkyl diols such as ethylene glycol, 1,2-propylene glycol, 1,3-propylene glycol, 1,3-butylene glycol, 1,4-butylene glycol, 2,3-butanediol, diethylene glycol, triethylene glycol, dipropylene glycol, 1,5-pentanediol, 1,6-hexanediol, neopentyl glycol, 2-ethyl-1,3-hexanediol and the like; alicyclic diols such as hydrogenated bisphenol A, cyclohexanedimethanol and the like; derivatives of bisphenol F and bisphenol S, such as, alkylene oxide obtained by reacting bisphenol F or bisphenol S with ethylene oxide, propylene oxide or the like; aromatic diols of dicarboxylic acid lower alkyl esters such as bishydroxyethylterephthalic acid, bishydroxypropylterephthalic acid, bishydroxybutylterephthalic acid and the like. There can be further mentioned, for example, bisphenol A derivative such as adducts of bisphenol A and alkylene oxide such as bisphenol A-ethylene oxide adducts, bisphenol A-propylene oxide adducts or the like. It is also possible to use a monohydric alcohol and a tri- or higher polyhydric alcohol for the purpose of molecular weight control. As preferred monohydric alcohols, there can be exemplified, for example, aliphatic monohydric alcohols such as octanol, decanol, dodecanol, myristyl alcohol, palmityl alcohol, stearyl alcohol and the like. They may have branches and unsaturated groups. As tri- or higher polyhydric alcohols, there can be exemplified, for example, glycerin, 2-methylpropanetriol, trimethylolpropane, trimethylolethane, sorbitol, sorbitan or the like. When a chain-extending takes place by a polyisocyanate, it is desirable to comprise at least one or more kinds of a tri- or higher polyhydric alcohol for obtaining a high molecular polymer fully. If the tri- or higher polyhydric alcohol component is less than 0.5 mole % based on all alcohol components, it is difficult to obtain a high molecular weight polymer when a chain-extending takes place by a polyisocyanate (d) to be described below and an offset resistance or durability tends to be poor. When the component is more than 20 mole %, a gelation easily takes place, badly deteriorating the polycondensation reaction rate in some cases. For this reason, the tri- or higher polyhydric alcohol component is preferably from 0.5 to 20 mole % and more preferably from 2 to 20 mole % of all alcohol components.

To prepare a binder resin for a toner of the present invention, PET and/or PBT are used. The molecular weight distribution, composition and production process of the above PET and PBT, and its shape when it is used are not restricted. Its weight-average molecular weight is preferably from about 30,000 to 90,000. From the aspect of environment, use of recycled products is preferable. Recycled products processed into, for example, a flake form can be properly used. Furthermore, not only recycled products, but also off-spec fiber waste or pellet discharged from the plant may be used.

The polycondensation reaction and depolymerization reaction according to the present invention can be conducted by a known process such as solvent-free high-temperature polycondensation, solution polycondensation or the like in an inert gas such as nitrogen gas or the like. In the reaction, the proportions of the polycarboxylic acid and polyhydric alcohol used are generally from 0.7 to 1.4 in terms of the molar ratio of the hydroxyl group of the latter to the carboxyl group of the former. By considering the terephthalic acid-derived portion, ethylene glycol-derived portion and butylene glycol-derived portion constituting PET and/or PBT as the above polycarboxylic acid and polyhydric alcohol respectively, the proportions of the polycarboxylic acid and polyhydric alcohol used are determined.

Concrete embodiment of the polycondensation reaction and depolymerization reaction is described with reference to an example of preparing a polyester resin (a1). As a preferred example of preparing a polyester resin (a1), there can be exemplified, for example, a method comprising subjecting PET and/or PBT to the depolymerization reaction in the presence of the alcohol and then adding the remaining alcohol and the acid component, and conducting the polycondensation reaction, or a method comprising feeding PET, PBT, the alcohol and the acid component collectively, and conducting the depolymerization reaction and polycondensation reaction at the same time.

The polyester resin (a1) can be used in combination of two or more components, each having different oxidation value or hydroxyl value.

Furthermore, as a preferred method of preparing a polyester resin (a2), a wax (c1) is also used in addition to PET or PBT, the alcohol component and the acid component in the above method, in the same manner as the acid component or the alcohol component.

The polyester resin (a2) can be used in combination of two or more components, each having different oxidation value or hydroxyl value.

In the polycondensation reaction or depolymerization reaction according to the present invention, use of PET is particularly preferable. The polycondensation is preferably conducted under a condition to have ethylene glycol component of from 5 to 90 mole % in PET to all alcohol components containing ethylene glycol component in PET. At this time, a reaction temperature is preferably from 200 to 270° C. and more preferably 220 to 260° C. When the reaction temperature is not more than 200° C., the solubility of PET is lowered so that the reaction time becomes longer. When the reaction temperature is not less than 270° C., the decomposition of the raw materials becomes intense in some cases.

The amount of a wax (c1) used for production of a polyester resin (a2) is preferably from 0.1 to 20 weight parts and, in particular, preferably from 0.1 to 10 weight parts, based on 100 weight parts of the polycarboxylic acid-derived portion and polyhydric alcohol-derived portion. When the amount is less than 0.1 weight part, an effect of performance improvement by the wax is not sufficient in some cases. On the other hand, when the amount exceeds 20 weight parts, a fixing roll or a sensitive material is contaminated in some cases.

A preferred hydroxyl value of the polyester resin in the present invention is from 4 to 100 KOHmg/g. A preferred lower limit is 10 KOHmg/g while a preferred upper limit is 60 KOHmg/g. As described above, when a polyester resin having two or more components, each having different hydroxyl value, is used, it may be good within the above range as a whole. Each polyester resin does not need to be in the above range.

When the hydroxyl value is less than 4 KOHmg/g, an offset resistance is poor in some cases. When the hydroxyl value exceeds 100 KOHmg/g, the fixing properties are insufficient in some cases.

Furthermore, when a polyester resin having two or more components, each having different hydroxyl value, is used, it is preferable to comprise at least a polyester resin having the hydroxyl value of not less than 15 KOHmg/g and more preferably not less than 30 KOHmg/g, and a polyester resin having the hydroxyl value of not more than 15 KOHmg/g and more preferably not more than 10 KOHmg/g from the viewpoint of a balance between the fixing properties and an offset resistance.

(Polyisocyanate (d))

As a polyisocyanate (d) to be used in the present invention, there can be exemplified, for example, diisocyanates such as hexamethylene diisocyanate, isophorone diisocyanate, tolylene diisocyanate, diphenylmethane diisocyanate, xylylene diisocyanate, tetramethylene diisocyanate, norbornene diisocyanate or the like. Further, other tri- or higher polyisocyanates can also be used.

The polyisocyanate (d) is preferably from 0.2 to 2 mole equivalent of isocyanate group for 1 mole equivalent of the hydroxyl group of the polyester resins such as polyester resins (a1) to (a3) and the like, and more preferably from 0.5 to 1.5 mole equivalent. When the mole equivalent is less than 0.2 mole equivalent, an offset resistance is poor in some cases. When the mole equivalent is more than 2 mole equivalent, there is a problem from the viewpoint of safety in that there is a possibility that unreacted polyisocyanate in production of the resin remains.

(Binder Resin for a Toner)

The binder resin for a toner of the present invention is obtained preferably from a polyester resin and a polyisocyanate (d) as described above, and a wax (c1) as required. There are no special restrictions on the reaction process. The reaction may be conducted by bringing the above components into contact with one another while stirring in a usual reactor or may be conducted while melt-kneading in an extruder. Further, a method comprising conducting the above polycondensation in the presence of a polyisocyanate (d) may be used.

Concretely, a method comprising reacting at least a polyester resin (a1) and a wax (c1) with a polyisocyanate (d) can be cited. More specifically, there can be exemplified, for example, (1) a method comprising reacting a polyester resin (a1) with a wax (c1) or bringing them into contact with each other and reacting a polyisocyanate (d) therewith, (2) a method comprising bringing a wax (c1) into contact with a polyisocyanate (d) or reacting a polyester resin (a1) therewith. Here, it should be noted that when the wax (c1) is a wax (c4), an effect of the present invention might not be obtained by conducting the contact after the reaction of a polyisocyanate (d) in some cases. This is considered as such because it is difficult for the wax (c4) to be introduced into the polyester resin skeleton after the reaction of the polyisocyanate (d) as the polyisocyanate (d) mainly reacts with a COOH group or an OH group in the polyester resin.

As another concrete method, a method comprising reacting a polyester resin (a2) with a polyisocyanate (d) can be cited. Further, a method comprising conducting the depolymerization, polycondensation reaction and urethane reaction at the same time in the presence of all of the above components can also be exemplified.

When an extruder is employed, more specifically, the polyester resin is fed into a twin screw extruder for kneading and a polyisocyanate (d) or a wax (c1) as required is further fed into the resin mixture while in kneading and conveying for melt-kneading. Other than the twin screw extruder, a single screw extruder, a static mixer, plastomill and the like can also be used.

The reaction temperature is preferably in the range of 100 to 200° C., and more preferably not less than 140° C. and not more than 190° C. When the temperature is less than 100° C., urethane extending reaction becomes insufficient; therefore, an offset resistance becomes inferior in some cases. When the temperature is more than 200° C., a resin is decomposed by the heat or a shearing force of the extruder in some cases.

The amount of the wax (c1) in the reaction of the above polyisocyanate with a polyester resin and preferably a polyester resin (a1) with a wax (c1) is preferably from 0.1 to 20 weight parts and, in particular, preferably from 0.1 to 10 weight parts, based on 100 weight parts of the above polyester resin. When the amount is less than 0.1 weight part, an effect of performance improvement by the wax is not sufficient in some cases. On the other hand, when the amount exceeds 20 weight parts, a fixing roll or a sensitive material is contaminated in some cases.

The binder resin for a toner of the present invention may contain other components to such an extent that the aim of the present invention is not influenced. An example thereof includes a wax. As the wax, in addition to a wax (c1), there can be exemplified, for example, low-molecular weight polyolefins such as polyethylene, polypropylene, polybutene and the like; silicone having a softening point by heating; aliphatic amides such as oleamide, erucamide, ricinoleamide, stearylamide and the like or natural waxes such as ceramic wax, rice wax, sugar wax, urushi wax, beeswax, carnauba wax, candelilla wax, montan wax and the like; and synthetic waxes such as a Fisher-Tropsch wax and the like; and modified materials thereof. Specific commercial products of the polyolefin wax include Hi-wax 800P, 400P, 200P, 100P, 720P, 420P, 320P, 405 MP, 320 MP, 4051E, 2203A, 1140H, NL800, NP055, NP105, NP505, NP805 and the like produced by Mitsui Chemicals, Inc. By using these waxes, the low-temperature fixing properties and offset resistance can be further improved. The amount of the wax added is preferably in the range of 0 to 20 weight % in the binder resin for a toner.

The above wax can be used in any steps, for example, during or after production of the binder resin for a toner, or in production of the toner to be described later.

As for the other resins which can be used together with the binder resin for a toner of the present invention, any known binder resins of a toner for development of a static charge image may be used. There can be mentioned, for example, homopolymers of styrene or its derivative, such as polystyrene, poly-p-chlorostyrene, polyvinyltoluene and the like; styrene type copolymers such as styrene-p-chlorostyrene copolymer, styrene-vinyltoluene copolymer, styrene-vinylnaphthalene copolymer, styrene-acrylate copolymer, styrene-methacrylate copolymer, styrene-methyl-□-chloromethacrylate copolymer, styrene-acrylonitrile copolymer, styrene-vinyl methyl ether copolymer, styrene-vinyl ethyl ether copolymer, styrene-vinyl methyl ketone copolymer, styrene-butadiene copolymer, styrene-isoprene copolymer, styrene-acrylonitrile-indene copolymer and the like; and resins such as polyvinyl chloride, phenolic resin, natural modified phenolic resin, natural resin-modified maleic acid resin, acrylic resin, methacrylic resin, polyvinyl acetate, silicone resin, polyester resins other than those mentioned above, polyurethane resin, polyamide resin, furan resin, epoxy resin, xylene resin, polyvinyl butyral, terpene resin, coumarone-indene resin, petroleum-based resin, crosslinked styrene type copolymer and the like.

Tg of the binder resin for a toner used in the present invention is preferably from 40 to 70° C. When Tg is less than 40° C., the resulting toner causes agglomeration of toner particles, which is called blocking, while when Tg is higher than 70° C., the fixing properties are worsened in some cases.

The binder resin for a toner used in the present invention has Mw/Mn of the tetrahydrofuran (THF) soluble component preferably in the range of 4 to 100 and more preferably in the range of 6 to 60. When an Mw/Mn is less than 4, an offset resistance is poor in some cases. Further, when the Mw/Mn is more than 100, the fixing properties are deteriorated in some cases. The above Mw/Mn is a value measured by gel permeation chromatography (GPC) under the conditions described below.

The binder resin for a toner used in the present invention has a peak molecular weight of from 1,000 to 30,000 when the THF soluble component is measured by GPC, more preferably from 1,000 to 20,000 and further preferably from 2,000 to 15,000. When the peak molecular weight is less than 1,000, an offset resistance and mechanical durability are not sufficient in some cases; while when the peak molecular weight is more than 30,000, the fixing properties are insufficient in some cases.

The THF insoluble component to be contained in the binder resin for a toner used in the present invention is preferably from 0 to 40 weight %. Further, the amount of exceeding 5 weight % is more preferable. A further preferred upper limit is 30 weight %. When the amount of the THF insoluble component is more than 40 weight %, the fixing properties are worsened in some cases. As the binder resin for a toner of the present invention preferably contains the THF insoluble component prepared by the urethane reaction, not only good offset resistance can be exhibited without damaging the good fixing properties, but also physical properties before and after making a toner hardly changes because the resin is hardly cut or broken while kneading in production of the toner. Furthermore, the isocyanate compound-derived structure unit has a high inter-molecular binding force and accordingly excellent mechanical durability can be obtained.

A density of the binder resin for a toner used in the present invention is preferably from 1.20 to 1.27 g/cm$^3$. When the density is less than 1.20 g/cm$^3$, the mechanical durability is worsened in some cases, while when the density is more than 1.27 g/cm$^3$, the grindability is worsened in some cases; therefore such densities are not preferable from the viewpoint of the productivity.

(Toner)

The electrophotographic toner for development of a static charge image of the present invention comprises the binder resin for a toner, charge-controlling agent, coloring agent, magnetic material and the like.

As the charge-controlling agent used in production of a toner of the present invention, known charge-controlling agents can be used singly or in combination. The charge-controlling agent is used in an amount necessary to allow the toner produced, to have an intended charge amount. It is preferably used in an amount of, for example, about 0.05 to 10 weight parts per 100 weight parts of the binder resin for a toner. As the positive charge-controlling agent, there can be mentioned, for example, nigrosine type dyes, quaternary ammonium salt compounds, triphenylmethane type compounds, imidazole type compounds, polyamine resins and the like. As the negative charge-controlling agent, there can be mentioned, for example, metal (Cr, Co, Al or Fe)-contained azo type dyes, metal salicylate compounds, metal alkylsalicylate compounds, calixarene compounds and the like.

In producing a toner for development of a static charge image of the present invention, there can be used, as the coloring agent, any coloring agent which has heretofore been known in toner production. As examples thereof, there can be mentioned dyes and pigments, such as fatty acid metal salts, various carbon blacks, phthalocyanine type dyes, rhodamine type dyes, quinacridone type dyes, triallylmethane type dyes, anthraquinone type dyes, azo type dyes, diazo type dyes or the like. These coloring agents can be used singly or in combination of two or more kinds.

The magnetic material which can be used in production of the toner for development of static charge image of the present invention, can be any of alloys, compounds, etc. each containing a ferromagnetic element, which have heretofore been used in production of magnetic toner. As examples of the magnetic material, there can be mentioned iron oxides or compounds of bivalent metal and iron oxide, such as magnetite, maghemite, ferrite and the like; metals such as iron, cobalt, nickel and the like; alloys of such a metal and other metal such as aluminum, cobalt, copper, lead, magnesium, tin, zinc, antimony, beryllium, bismuth, cadmium, calcium, manganese, selenium, titanium, tungsten, vanadium and the like; and mixtures thereof. These magnetic materials have an average particle diameter of preferably about 0.1 to 2 micro-meters and more preferably about 0.1 to 0.5 micro-meters. Furthermore, the content of the magnetic material in the toner is usually from about 20 to 200 weight parts and preferably from 40 to 150 weight parts based on 100 weight parts of the above binder resin for a toner. Furthermore, the saturated magnetization of a toner is preferably from 15 to 35 emu/g (measurement magnetic field: 1 kilooersted).

The toner of the present invention can, if necessary, further contain a known additive being conventionally used in production of toners, for example, a lubricant, a flowability improver, an abrasive, a conductive grant agent, an anti-image peeling agent, etc. As examples thereof, there can be mentioned polyvinylidene fluoride, zinc stearate or the like as an lubricant, colloidal silica, aluminum oxide, titanium oxide or the like as a flowability improver, cerium oxide, silundum, strontium titanate, tungsten carbide, calcium carbonate or the like as an abrasive, carbon black, tin oxide or the like as a conductive grant agent. Fine powders of fluorine-contained polymer such as polyvinylidene fluoride or the like are desirable from the viewpoints of the fluidity, abrasive properties, charging stability or the like.

The toner according to the present invention can be produced using the conventionally known process below. In general, the toner component materials as described above are satisfactorily mixed with mixers such as a ball mill, a HENSCHEL MIXER or the like. The resulting mixture is then finely kneaded using a heat kneader such as a heat roll kneader, a single screw or twin screw extruder or the like, and cool-solidified and then mechanically coarsely ground using a pulverizer such as a hammer mill. The coarsely ground mixture is finely ground using a jet mill and the like, followed by classification. But, a method of producing the toner is not particularly restricted thereto and, other toner component material is dispersed in a solution of binder resin, and spray-dried to produce the toner, which is a so-called microcapsule method. Other methods can also be arbitrarily adopted.

The toner of the present invention is mixed with a carrier and the resulting mixture can be used as a 2-component or 1.5-component developer. Or it can be used as a magnetic monocomponent developer comprising a magnetic powder in the toner, a non-magnetic monocomponent developer that does not use either a carrier or a magnetic powder, or a micro-toning developer. When the toner is used as a 2-component or 1.5-component developer, any of conventionally known carriers can be used as a carrier. As carriers which can be used, there can be mentioned, for example, magnetic powder such as iron powder, ferrite powder, nickel powder or glass beads, etc., or of which surfaces are coated with a resin or the like. As resins to coat the surfaces of carriers, there can be mentioned, for example, styrene-acrylate copolymer, styrene-methacrylate copolymer, acrylate copolymer, methacrylate copolymer, fluorine-contained resin, silicon-contained resin, polyamide resin, ionomer resin, polyphenylene sulfide resin or the like, or compounds thereof. Among these, fluorine-contained resin and silicon-contained resin are particularly preferred owing to their small forming of the spent toner.

A desirable weight-average particle diameter of the toner of the present invention is less than or equal to 10 micro-meters, preferably from 3 to 10 micro-meters and more preferably from 5 to 10 micro-meters from the standpoint of the development features. When the weight-average particle diameter of the toner is more than 10 micro-meters, it is difficult to achieve fine images; therefore such a diameter is not preferable from the standpoint of the development features in some cases. Incidentally, the particle-size distribution of the toner can be measured, for example, with a coulter counter.

As the toner of the present invention, an electrophotographic toner for static charge image development comprising a polyester resin (a4) obtained from the above polyester resin (a1) and a polyisocyanate (d), and a wax (c2) having a substituent of aromatic structure having from 6 to 750 carbon atoms is also one of preferred embodiments.

A method of producing a polyester resin (a4) and conditions thereof can be adopted in compliance with the method or conditions of bringing the above polyester resins (a1) to (a3) into contact with a polyisocyanate (d) for reacting. As for the above wax (c2), a modified polyethylene wax (c3) obtained from a polyethylene wax and a styrene type compound is more preferable. Further, the components of the magnetic material, charge-controlling agent, coloring agent, other waxes or the like can also be used as described above.

In the present invention, it is considered that the above wax (c1) is fed into the skeleton by the reaction with, for example, a carboxyl group or a hydroxyl group in a polyester resin, a polyisocyanate (d) or the like, or finely dispersed in a polyester resin. Accordingly, the binder resin for a toner or the toner of the present invention is superior in the productivity in a grinding process, antiblocking properties or offset resistance because dispersability of other wax components or other additives is improved.

The polyester structure part of the binder resin for a toner of the present invention has a terephthalate skeleton as a main component so that the polarity increases. Thus, the dispersability of a coloring agent, anti-bending durability and familiarity with paper are highly excellent, whereas the compatibility with a hydrophobic wax is generally in an unfavorable structure. However, the binder resin for a toner and the toner of the present invention can remarkably enhance the toner performance due to introduction of a wax and can achieve both the productivity in a grinding process, antiblocking properties or offset resistance and the above features by using a specific wax (c1) as described above. Further, the binder resin for a toner of the present invention can employ a polyester as a raw material such as retrieved PET bottles or the like, thus contributing to a recycling society. For this reason, the industrial value of the present invention is great.

EXAMPLES

The present invention is described specifically below by way of Examples. However, the present invention is not restricted to these Examples. Also, “parts” hereinafter indicates weight parts unless otherwise mentioned specifically.

The molecular weight and molecular weight distribution of the binder resin for a toner was measured by GPC. The measurement was conducted in terms of the following conditions, based on the commercial monodispersed standard polystyrene.

GPC apparatus: JASCO TWINCLE HPLC, manufactured by JASCO Corp.

Detector: SHODEX RI-71S, manufactured by Showa Denko K. K.

Solvent: Tetrahydrofuran

Column: A piece of KF-G, three pieces of KF-807L and a piece of KF800D, manufactured by Showa Denko K. K., were connected in serial for use.

Flow rate: 1.0 ml/min

Sample: 0.25% THF solution

Incidentally, the reliability of the measurement under the above conditions can be confirmed if Mw/Mn of NBS706 polystyrene sample (Mw=288,000, Mn=137,000, Mw/Mn=2.11) is 2.11±0.10.

The glass transition temperature (Tg) of the present invention was measured using DSC-20 (a product of Seiko Instruments Inc.) according to differential scanning calorimetry (DSC). About 10 mg of a sample was subjected to temperature elevation from −20 to 100° C. at a rate of 10° C./min to obtain a curve; in the curve, an intersection between the base line and the inclined line of the endothermic peak was determined; the Tg of the sample was determined from the intersection. It is desired that, before the above temperature elevation measurement, the sample resin is heated to about 200° C., is kept at that temperature for 5 minutes, and is cooled quickly to normal temperature (25° C.), in order to allow the sample to unify a thermal history.

The amount of THF insoluble component and that of THF soluble component were obtained by the following method. A solution of about 5 weight % was prepared by using a resin of about 2.5 g and THF of about 47.5 g (Hereinafter, the concentration of the solution is referred to as “RC”. RC is obtained from an accurate weighing value of the resin weight and THF weight). Namely, the above mixture was stirred at 25±3° C. for 12 hours to completely dissolve the soluble component of the resin. Then, the obtained solution was allowed to stand for 16 hours. After the separation of the insoluble portion and the supernatant liquid, the supernatant liquid was analyzed for the analysis of the concentration.

(Hereinafter, the concentration of the supernatant liquid is referred to as “SC.” In order to obtain SC value, about 5 g of the supernatant liquid was taken and dried at 150° C. for an hour to remove the tetrahydrofuran. SC was calculated from the accurate weighing value and measured value of the residual resin weight.) From the number of RC and SC, the ratio of THF insoluble component and THF soluble component of the sample are calculated by the following formula.

The ratio of THF soluble component; SC/RC×100 (%)

The ratio of THF insoluble component; (RC—SC)/RC×100 (%)

Next, the supernatant liquid was removed from the solution by decantation. The residue was washed with THF several times and was dried up under a reduced pressure at 40° C. Thus, the THF insoluble component was obtained.

The acid value of the present invention refers to mg of potassium hydroxide necessary to neutralize 1 g of the resin. The acid value was measured according to the neutralization titrimetric method. 5 g of the sample was dissolved in 50 cc of a mixed solvent having the ratio of xylene to dimethyl formamide of 1:1 (weight mass ratio) and several droplets of a phenolphthalein-ethanol solution were added thereto as an indicator and then the resulting mixture was titrated with a 1/10 N KOH aqueous solution. The acid value (KOHmg/g) was calculated from the titration amount and sample weight mass at a time when a point in which the color of the sample solution was painted from colorlessness to purple was taken for an end point.

Further, the hydroxyl value of the present invention was measured according to the back titration with the following acid anhydride. 5 cc of a specially prepared phthalized reagent (prepared at a ratio of 500 cc of pyridine/70 g of phthalate/10 g of imidazole) was added to 2 g of a resin and dissolved therein. Then, the resulting solution was allowed to stand at 100° C. for an hour. After that, 1 cc of water, 70 cc of tetrahydrofuran and several droplets of a phenolphthalein-ethanol solution were added to the resin solution and then the resulting mixture was titrated with a 0.4 N NaOH aqueous solution. The hydroxyl value (KOHmg/g) was calculated from the titration amount and sample weight at a time when a point in which the color of the sample solution was painted from colorlessness to purple was taken for an end point.

Furthermore, evaluation method of the toner conducted in the present invention is described below.

(1) Fixing Properties

An unfixed image was formed using a copier produced by remodeling of a commercial electrophotographic copier. This unfixed image was fixed using a heat roller fixing apparatus produced by remodeling of the fixing section of a commercial copier. The fixing of a toner was conducted at a fixing speed of the heat roll of 300 mm/sec with the temperature of the heat roller being changed at intervals of 5° C. The fixed image obtained was rubbed 10 times by applying a load of 0.5 kgf using a sand eraser (a product of Tombow Pencil Co., Ltd.), and the image densities before and after the rubbing test were measured using a Macbeth reflection densitometer. The lowest fixing temperature, when the change of image density became not less than 70%, was taken as the lowest fixing temperature of the toner. Incidentally, the heat roller fixing apparatus used had no silicone oil feeder. The measurement was conducted under normal temperature and normal humidity (temperature=22° C., relative humidity=55%).

An evaluation was conducted according to the following criteria.

1: Lowest fixing temperature≦170° C.

2: 190° C.≧lowest fixing temperature>170° C.

3: Lowest fixing temperature>190° C.

(2) Offset Resistance

The offset resistance was evaluated as follows. According to the above measurement of the lowest fixing temperature, an unfixed image was formed using the above copier; the toner image was transferred and fixed using the above heat roller fixing apparatus. Then, a white transfer paper was fed into the heat roller fixing apparatus under the same conditions; and the appearance of toner staining on the transfer paper was visually examined. This operation was repeated by gradually increasing the set temperature of the heat roller of the heat roller fixing apparatus. The lowest set temperature at which toner staining appeared on the transfer paper was taken as the temperature of offset appearance. The environmental conditions were normal temperature and normal humidity (temperature=22° C., relative humidity=55%).

An evaluation was conducted according to the following criteria.

1: Temperature of offset appearance≧240° C.

2: 240° C.>temperature of offset appearance≧220° C.

3: 220° C.>Temperature of offset appearance (3) Development Durability

The development durability of a toner was evaluated by filling a toner in a commercial copier (a product of Toshiba Corporation, named Presio 5560), then conducting continuous copying of 100,000 copies, and evaluating the number of sheets fed from the start to the time when the deterioration of image density and image quality began according to the following criteria.

1: No deterioration at 70,000th and more sheets

2: Deterioration began at not less than 50,000th and less than 70,000th sheets

3: Deterioration began at less than 50,000th sheets (4) Antiblocking Properties (Storability)

The sample resin was allowed to stand for 48 hours under the environmental conditions of a temperature of 50° C. and a relative humidity of 50%, and 5 g was fed into a sieve of 150 mesh. Then, the scale of a rheostat of a powder tester (Hosokawa Micrometrics Laboratory) was set to 3 for vibrating it for a minute. After vibration, the weight remained on the sieve of 150 mesh was measured to obtain the residual weight ratio. An evaluation was conducted according to the following criteria.

1: Less than 20%

2: Not less than 20% and not more than 35%

3: Greater than 35%

Firstly, the embodiments of the binder resin for a toner and the toner using the above polyester resin (a3) are exemplified below.

Production Example of Acid Modified Polyethylene Wax

The production of an acid modified polyethylene wax of the present invention was conducted as follows. 800 g of a wax of [□]=0.22 synthesized with a metallocene catalyst was melt-kneaded at a temperature of 160° C. and stirred in a continuous stirred reactor. In doing so, pure oxygen (commercial oxygen) was fed at a rate of 6N liter for a minute for reacting therewith for 10 hours. Then, a polyethylene wax (C-1) of [□]=0.15 containing 30 KOHmg/g of an acid value as the content of a COOH group and 20 KOHmg/g of a hydroxyl value as the content of an OH group was obtained.

The production of a polyester resin and urethane modified polyester resin of the present invention was conducted as follows. A polyester resin A-1 is described in concrete terms. The resins A-2 to A-6 and the resins B-1 to B-5 were produced in the same manner with the only difference in the conditions described in Table 1 and Table 2. The results are shown in Table 1 and Table 2. In production of the resins A-3 and B-4, a recycled PET was used for PET.

Production Example of Polyester Resin (A-1)

A 5-liter, 4-necked flask was provided with a reflux condenser, a water-separating unit, a nitrogen gas inlet tube, a thermometer and a stirrer. Thereinto were fed 50 mole % of a recycled PET flake (weight-average molecular weight: 75,000) on the ethylene glycol unit in the PET, 22 mole % of Actcall KB300 (a product of bisphenol A derivative by Mitsui Takeda Chemicals, Inc.), 20.0 mole % of triethylene glycol, 8 mole % of trimethylolpropane and 36 mole % of terephthalic acid, 0.5 weight % of dibutyl tin oxide and 3.0 weight % of the acid modified polyethylene wax (C-1). The depolymerization and polycondensation were conducted at 240° C. with nitrogen being introduced into the flask. When the acid value of the reaction mixture reached a predetermined level, the reaction mixture was taken out of the flask, cooled, and ground to obtain a resin A-1.

TABLE 1

| | Resin | | | | | |
|---|---|---|---|---|---|---|
| | A-1 | A-2 | A-3 | A-4 | A-5 | A-6 |
| PET (mol %) | 50 | — | 25 | 62 | 50 | 62 |
| PBT (mol %) | — | 50 | 25 | — | — | — |
| KB300 (mol %) | 22 | 32 | 22 | 24 | 22 | 24 |
| Triethylene glycol (mol %) | 20 | 10 | 20 | 4 | 20 | 4 |
| Trimethylolpropane (mol %) | 8 | 8 | 8 | 10 | 8 | 10 |
| Terephthalic acid (mol %) | 36 | 36 | 36 | 18 | 36 | 18 |
| Benzoic acid (mol %) | — | — | — | 18 | — | 18 |
| Isododecenyl succinic anhydride (mol %) | — | — | — | 10 | — | 10 |
| Wax (weight %) | 3 | 9 | 3 | 5 | — | — |

TABLE 2

| | Resin | | | | |
|---|---|---|---|---|---|
| | B-1 | B-2 | B-3 | B-4 | B-5 |
| PET (mol %) | 66.5 | 61 | — | 34 | 66.5 |
| PBT (mol %) | — | — | 67 | 33 | — |
| KB300 (mol %) | 28.5 | 26 | 33 | 28 | 28.5 |
| Triethylene glycol (mol %) | — | 13 | — | — | — |
| Trimethylolpropane (mol %) | 5 | — | — | 5 | 5 |
| Terephthalic acid (mol %) | 35.5 | 41 | 33 | 33 | 35.5 |
| Benzoic acid (mol %) | 14 | 6 | 10 | 20 | 14 |
| Wax (weight %) | 1 | 3 | 5 | 1 | — |

The embodiments of the present invention are described specifically for a representative case, i.e., Example 1. Also for resins 2 to 5, i.e., Examples 2 to 5, resins and toners were obtained and evaluated in the same manner as in Example 1 with the only difference in the conditions described in Table 3. The proportions of resin, the ratios of tolylene diisocyanate added, the results of resin analysis and the properties of toner are shown in Table 3, together with those of Example 1.

Example 1

30 weight parts of resin A-1 as the resin (A), 70 weight parts of resin B-1 as the resin (B) and 2.0 weight parts of tolylene diisocyanate were kneaded and reacted in a twin screw extruder to obtain resin 1. The resin had a Tg of 55.9° C., an acid value of 18.6, an Mw/Mn of 17.8 as measured by GPC, and a peak molecular weight of 7,000.

100 weight parts of a resin 1, 6 weight parts of a carbon black (MA-100, a product of Mitsubishi Chemical Corporation) and 1.5 weight parts of a charge control agent (BONTRON E-84, a product of Orient Chemical Instruments Inc.) were dispersed and mixed using a HENSCHEL MIXER; the resulting material was melt-kneaded at 120° C. using a twin screw extruder PCM-30 (a product of Ikegai Corporation) to obtain a toner composition in the bulk state. The resin composition after melt-kneading was coarsely ground using a hammer mill. The coarsely ground resin was finely ground using a jet grinder (IDS 2, a product of Nippon Pneumatic Co., Ltd.), followed by air classification, to obtain a toner fine powder having an average particle diameter of 10 micro-meters (5 micro-meters or less: 3 weight %, 20 micro-meters or more: 2 weight %). Then, to 100 weight parts of the toner, 0.5 weight parts of a hydrophobic silica (AEROSIL R-972, a product of Nippon Aerosil Co., Ltd.) was mixed using a HENSCHEL MIXER, feeding from the exterior to obtain toner particles. The toner particles were examined for the fixing properties, offset resistance, development durability and antiblocking properties.

Example 6

A toner was produced in the same manner as in Example 1, except that 3.0 weight parts of a polypropylene wax (Hi-wax NP105; a product of Mitsui Chemicals, Inc.) was added, dispersed and mixed using a HENSCHEL MIXER; the resulting material was melt-kneaded at 120° C. using a twin screw extruder PCM-30 (a product of Ikegai Corporation) to obtain a toner composition in the bulk state. The results are shown in Table 3.

TABLE 3

| | | Example No. | | | | | | |
|---|---|---|---|---|---|---|---|---|
| | | Example 1 | Example 2 | Example 3 | Example 4 | Example 5 | Example 6 | Example 7 |
| | Resin | Resin 1 | Resin 2 | Resin 3 | Resin 4 | Resin 5 | Resin 1 | Resin 1 |
| Resin A | Type | A-1 | A-1 | A-2 | A-3 | A-4 | A-1 | A-1 |
| | (weight part) | 30 | 40 | 30 | 30 | 100 | 30 | 30 |
| Resin B | Type | B-1 | B-2 | B-3 | B-4 | — | B-1 | B-1 |
| | (weight part) | 70 | 60 | 70 | 70 | — | 70 | 70 |
| | Wax (C-1) in a resin | Yes | Yes | Yes | Yes | Yes | Yes | Yes |
| | Tolylene diisocyanate (weight part) | 2.0 | 2.5 | 2.0 | 2.0 | 2.0 | 2.0 | 2.0 |
| | Amount of THF insoluble component (weight %) | 12 | 11 | 16 | 14 | 10 | 12 | 12 |
| | Tg (° C.) | 55.9 | 51.8 | 50.3 | 52.5 | 53.4 | 55.9 | 55.9 |
| | Acid value (KOHmg/g) | 18.6 | 14.3 | 14.8 | 15.3 | 2 | 18.6 | 18.6 |
| GPC | Mw/Mn | 17.8 | 30.9 | 21.9 | 25.8 | 41.5 | 17.8 | 17.8 |
| | Peak molecular weight | 7000 | 8000 | 8000 | 7000 | 9000 | 7000 | 7000 |
| Wax | Type | — | — | — | — | — | PP | PP |
| | Amount added (weight %) | — | — | — | — | — | 3 | 5 |
| | Fixing properties | 1 | 1 | 1 | 1 | 1 | 1 | 1 |
| | Offset resistance | 1 | 1 | 1 | 1 | 1 | 1 | 1 |
| | Development durability | 1 | 1 | 1 | 1 | 2 | 2 | 2 |
| | Antiblocking properties | 1 | 1 | 1 | 1 | 1 | 1 | 1 |

Example 7

A toner was produced in the same manner as in Example 6, except that the amount of a polypropylene wax (Hi-wax NP105; a product of Mitsui Chemicals, Inc.) was changed to 5.0 weight parts. The results are shown in Table 3.

Comparative Example 1

30 weight parts of resin A-5 (wax (C-1), content: 0 weight %) as the resin (A), 70 weight parts of resin B-5 (wax (C-1), content: 0 weight %) as the resin (B) and 2.0 weight parts of tolylene diisocyanate were kneaded and reacted in a twin screw extruder to obtain resin 6. The resin had a Tg of 62.9° C., an Mw/Mn of 20.9 as measured by GPC, and a peak molecular weight of 7,000.

100 weight parts of a resin 6, 6 weight parts of a carbon black (MA-100, a product of Mitsubishi Chemical Corporation), 1.5 weight parts of a charge control agent (BONTRON E-84, a product of Orient Chemical Instruments Inc.) and 3.0 weight parts of an acid modified polyethylene wax (C-1) were dispersed and mixed using a HENSCHEL MIXER; the resulting material was melt-kneaded at 120° C. using a twin screw extruder PCM-30 (a product of Ikegai Corporation) to obtain a toner composition in the bulk state. The resin composition after melt-kneading was coarsely ground using a hammer mill. The coarsely ground resin was finely ground using a jet grinder (IDS 2, a product of Nippon Pneumatic Co., Ltd.), followed by air classification, to obtain a toner fine powder having an average particle diameter of 10 micro-meters (5 micro-meters or less: 3 weight %, 20 micro-meters or more: 2 weight %). Then, to 100 weight parts of the toner, 0.5 weight parts of a hydrophobic silica (AEROSIL R-972, a product of Nippon Aerosil Co., Ltd.) was mixed using a HENSCHEL MIXER, feeding from the exterior to obtain toner particles. The toner particles were examined for the fixing properties, offset resistance, development durability and antiblocking properties. The results are shown in Table 4.

Comparative Example 2

A toner was produced in the same manner as in Comparative Example 1, except that the amount of an acid modified polyethylene wax (C-1) was changed to 5.0 weight parts. The results are shown in Table 4.

TABLE 4

| | | Comparative Example No. | | | | |
|---|---|---|---|---|---|---|
| | | Comparative Example 1 | Comparative Example 2 | Comparative Example 3 | Comparative Example 4 | Comparative Example 5 |
| Resin | | Resin 6 | Resin 6 | Resin 6 | Resin 7 | Resin 8 |
| Resin A | Type | A-5 | A-5 | A-5 | A-5 | A-6 |
| | (weight part) | 30 | 30 | 30 | 40 | 100 |
| Resin B | Type | B-5 | B-5 | B-5 | B-5 | — |
| | (weight part) | 70 | 70 | 70 | 60 | — |
| Wax (C-1) in a resin | | N/A | N/A | N/A | N/A | N/A |
| Tolylene diisocyanate (weight part) | | 2.0 | 2.0 | 2.0 | 2.4 | 1.8 |
| Amount of THF insoluble component (weight part) | | 10 | 10 | 10 | 8 | 5 |
| Tg (° C.) | | 62.9 | 62.9 | 62.9 | 61.6 | 56.5 |
| Acid value (KOHmg/g) | | 17.8 | 17.8 | 17.8 | 15.6 | 2.0 |
| GPC | Mw/Mn | 20.9 | 20.9 | 20.9 | 32.9 | 43.8 |
| | Peak molecular weight | 7000 | 7000 | 7000 | 8000 | 9000 |
| Wax | Type | C-1 | C-1 | C-1 + PP | C-1 | C-1 |
| | Amount added (weight %) | 3 | 5 | 3 + 3 | 3 | 3 |
| Fixing properties | | 1 | 1 | 1 | 1 | 2 |
| Offset resistance | | 1 | 1 | 1 | 1 | 1 |
| Development durability | | 2 | 3 | 3 | 2 | 2 |
| Antiblocking properties | | 2 | 3 | 3 | 2 | 2 |

Comparative Example 3

A toner was produced in the same manner as in Comparative Example 1, except that 3.0 weight parts of a polypropylene wax (Hi-wax NP105; a product of Mitsui Chemicals, Inc.) was added, dispersed and mixed using a HENSCHEL MIXER; the resulting material was melt-kneaded at 120° C. using a twin screw extruder PCM-30 (a product of Ikegai Corporation) to obtain a toner composition in the bulk state. The results are shown in Table 4.

Comparative Example 4

40 weight parts of resin A-5 as the resin (A), 60 weight parts of resin B-5 as the resin (B) and 2.4 weight parts of tolylene diisocyanate were kneaded and reacted in a twin screw extruder to obtain resin 7. The resin had a Tg of 61.6° C., an Mw/Mn of 32.9 as measured by GPC, and a peak molecular weight of 8,000. Further, a toner was produced in the same as in Comparative Example 1, except that the resin 7 was used. The results are shown in Table 4.

Comparative Example 5

100 weight parts of resin A-6 as the resin (A) and 1.8 weight parts of tolylene diisocyanate were kneaded and reacted in a twin screw extruder to obtain resin 8. The resin had a Tg of 59.5° C., an Mw/Mn of 43.8 as measured by GPC, and a peak molecular weight of 9,000. Further, a toner was produced in the same as in Comparative Example 1, except that the resin 8 was used. The results are shown in Table 4.

In succession, the embodiments of the binder resin for a toner and the toner using a resin obtained from the polyester resin (a1), a wax (b3) and a polyisocyanate (d) are exemplified below.

The production of a polyester resin and urethane modified polyester resin of the present invention was conducted as follows. A polyester resin A-11 is described in concrete terms. The resins A-12 and A-13 and the resins B-11 and B-12 were produced in the same manner as the resin A-11 with the only difference in the conditions described in Table 5. The results are shown in Table 5, together with those of A-11. In production of the resins A-12 and B-12, a recycled PET was used for PET.

Production Example of Polyester Resin (A-11)

A 5-liter, 4-necked flask was provided with a reflux condenser, a water-separating unit, a nitrogen gas inlet tube, a thermometer and a stirrer. Thereinto were fed 50 mole % of a recycled PET flake (weight-average molecular weight: 75,000) on the ethylene glycol unit in the PET, 22 mole % of Actcall KB300 (a product of Mitsui Takeda Chemicals, Inc.), 21 mole % of triethylene glycol, 7 mole % of trimethylolpropane, 36 mole % of terephthalic acid and 0.5 weight % of dibutyl tin oxide. The depolymerization and polycondensation were conducted at 240° C. with nitrogen being introduced into the flask. When the acid value of the reaction mixture reached a predetermined level, the reaction mixture was taken out of the flask, cooled, and ground to obtain a resin A-11.

TABLE 5

| | Resin | | | | |
|---|---|---|---|---|---|
| | A-11 | A-12 | A-13 | B-11 | B-12 |
| PET (mol %) | 50 | 25 | 59 | 66.5 | 34 |
| PBT (mol %) | — | 25 | — | — | 33 |
| KB300 (mol %) | 22 | 22 | 25 | 28.5 | 28 |
| Triethylene glycol (mol %) | 21 | 20 | 6 | — | — |
| Trimethylolpropane (mol %) | 7 | 8 | 10 | 5 | 5 |
| Terephthalic acid (mol %) | 36 | 36 | 21 | 35.5 | 33 |
| Benzoic acid (mol %) | — | — | 15 | 14 | 20 |
| Isododecenyl succinic anhydride (mol %) | — | — | 6 | — | — |

The embodiments of the present invention are described specifically for a representative case, i.e., Example 8. Also for resins 12 to 17, i.e., Examples 9 to 14, resins and toners were obtained and evaluated in the same manner as in Example 8 with the only difference in the conditions described in Table 6 and Table 7. The proportions of resin, the ratios of tolylene diisocyanate added, the results of resin analysis and the properties of toner are shown in Table 6 and Table 7, together with those of Example 8.

Example 8

40 weight parts of resin A-11 as the resin (A), 60 weight parts of resin B-11 as the resin (B), and 3.0 weight parts of acid modified polyethylene wax (C-1) and 2.4 weight parts of tolylene diisocyanate were kneaded and reacted in a twin screw extruder to obtain resin 11. The resin had a Tg of 58.4° C., an acid value of 15.8, an Mw/Mn of 44.7 as measured by GPC, and a peak molecular weight of 7,000.

100 weight parts of a resin 11, 6 weight parts of a carbon black (MA-100, a product of Mitsubishi Chemical Corporation) and 1.5 weight parts of a charge control agent (BONTRON E-84, a product of Orient Chemical Instruments Inc.) were dispersed and mixed using a HENSCHEL MIXER; the resulting material was melt-kneaded at 120° C. using a twin screw extruder PCM-30 (a product of Ikegai Corporation) to obtain a toner composition in the bulk state. The resin composition after melt-kneading was coarsely ground using a hammer mill. The coarsely ground resin was finely ground using a jet grinder (IDS 2, a product of Nippon Pneumatic Co., Ltd.), followed by air classification, to obtain a toner fine powder having an average particle diameter of 10 micrometers (5 micro-meters or less: 3 weight %, 20 micro-meters or more: 2 weight %). Then, to 100 weight parts of the toner, 0.5 weight parts of a hydrophobic silica (AEROSIL R-972, a product of Nippon Aerosil Co., Ltd.) was mixed using a HENSCHEL MIXER, feeding from the exterior to obtain toner particles. The toner particles were examined for the fixing properties, offset resistance, development durability and antiblocking properties.

TABLE 6

| | | Example No. | | | | |
|---|---|---|---|---|---|---|
| | | Example 8 | Example 9 | Example 10 | Example 11 | Example 12 |
| Resin | | Resin 11 | Resin 12 | Resin 13 | Resin 14 | Resin 15 |
| Resin A | Type | A-11 | A-11 | A-12 | A-13 | A-11 |
| | (weight part) | 40 | 30 | 40 | 100 | 40 |
| Resin B | Type | B-11 | B-11 | B-12 | | B-11 |
| | (weight part) | 60 | 70 | 60 | | 60 |
| Tolylene diisocyanate (weight part) | | 2.4 | 2.1 | 2.4 | 2.1 | 2.3 |
| Addition condition while in urethane reaction | Wax type | C-1 | C-1 | C-1 | C-1 | C-1 |
| | Amount added (weight %) | 3 | 3 | 3 | 3 | 1 |
| Amount of THF insoluble component (weight %) | | 12 | 14 | 12 | 8 | 10 |
| Tg (° C.) | | 58.4 | 58.9 | 50.7 | 60.2 | 60.1 |
| Acid value (KOHmg/g) | | 15.8 | 18.2 | 11.4 | 2 | 15.5 |
| GPC | Mw/Mn | 44.7 | 19.5 | 30.8 | 38 | 38.3 |
| | Peak molecular weight | 7000 | 7000 | 7000 | 9000 | 7000 |
| Addition condition while in toner kneading | Wax type | — | — | — | — | — |
| | Amount added (weight %) | — | — | — | — | — |
| Fixing properties | | 1 | 1 | 1 | 1 | 1 |
| Offset resistance | | 1 | 1 | 1 | 1 | 1 |
| Development durability | | 1 | 1 | 1 | 2 | 1 |
| Antiblocking properties | | 1 | 1 | 1 | 1 | 1 |

Example 15

A toner was produced in the same manner as in Example 8, except that 3.0 weight parts of a polypropylene wax (Hi-wax NP105; a product of Mitsui Chemicals, Inc.) was added, dispersed and mixed using a HENSCHEL MIXER; the resulting material was melt-kneaded at 120° C. using a twin screw extruder PCM-30 (a product of Ikegai Corporation) to obtain a toner composition in the bulk state. The results are shown in Table 7.

Example 16

A toner was produced in the same manner as in Example 15, except that the amount of a polypropylene wax (Hi-wax NP105; a product of Mitsui Chemicals, Inc.) was changed to 5.0 weight parts. The results are shown in Table 7.

tion), 1.5 weight parts of a charge control agent (BONTRON E-84, a product of Orient Chemical Instruments Inc.) and 1.0 weight part of an acid modified polyethylene wax (C-1) were dispersed and mixed using a HENSCHEL MIXER; the resulting material was melt-kneaded at 120° C. using a twin screw extruder PCM-30 (a product of Ikegai Corporation) to obtain a toner composition in the bulk state. The resin composition after melt-kneading was coarsely ground using a hammer mill. The coarsely ground resin was finely ground using a jet grinder (IDS 2, a product of Nippon Pneumatic Co., Ltd.), followed by air classification, to obtain a toner fine powder having an average particle diameter of 10 micro-meters (5 micro-meters or less: 3 weight %, 20 micro-meters or more: 2 weight %). Then, to 100 weight parts of the toner, 0.5 weight parts of a hydrophobic silica (AEROSIL R-972, a product of Nippon Aerosil Co., Ltd.) was mixed using a HENSCHEL MIXER, feeding from the exterior to obtain toner particles. The toner particles were examined for the fixing properties, offset resistance, development durability and antiblocking properties. The results are shown in Table 8.

TABLE 7

| | | Example No. | | | |
|---|---|---|---|---|---|
| | | Example 13 | Example 14 | Example 15 | Example 16 |
| Resin | | Resin 16 | Resin 17 | Resin 11 | Resin 11 |
| Resin A | Type | A-11 | A-11 | A-11 | A-11 |
| | (weight part) | 40 | 40 | 40 | 40 |
| Resin B | Type | B-11 | B-11 | B-11 | B-11 |
| | (weight part) | 60 | 60 | 60 | 60 |
| Tolylene diisocyanate (weight part) | | 2.6 | 2.7 | 2.4 | 2.4 |
| Addition condition while in urethane reaction | Wax type | C-1 | C-1 | C-1 | C-1 |
| | Amount added (weight %) | 10 | 15 | 3 | 3 |
| THF insoluble component (weight %) | | 20 | 25 | 12 | 12 |
| Tg (° C.) | | 52.9 | 48.6 | 58.4 | 58.4 |
| Acid value (KOHmg/g) | | 16.3 | 16.8 | 15.8 | 15.8 |
| GPC | Mw/Mn | 21.5 | 14.8 | 44.7 | 44.7 |
| | Peak molecular weight | 8000 | 8000 | 7000 | 7000 |
| Addition condition while in toner kneading | Wax type | — | — | PP | PP |
| | Amount added (weight %) | — | — | 3 | 5 |
| Fixing properties | | 1 | 1 | 1 | 1 |
| Offset resistance | | 1 | 1 | 1 | 1 |
| Development durability | | 1 | 1 | 1 | 1 |
| Antiblocking properties | | 2 | 2 | 1 | 1 |

Comparative Example 6

40 weight parts of resin A-11 as the resin (A), 60 weight parts of resin B-11 as the resin (B), and 2.3 weight parts of tolylene diisocyanate were kneaded and reacted in a twin screw extruder to obtain resin 18. The resin had a Tg of 61.4° C., an acid value of 15.4, an Mw/Mn of 42.5 as measured by GPC, and a peak molecular weight of 7,000.

100 weight parts of a resin 18, 6 weight parts of a carbon black (MA-100, a product of Mitsubishi Chemical Corpora- Comparative Example 7

A toner was produced in the same manner as in Comparative Example 6, except that the amount of a acid modified polyethylene wax (C-1) was changed to 3.0 weight parts. The results are shown in Table 8.

TABLE 8

| | | Comparative Example No. | | | | |
|---|---|---|---|---|---|---|
| | | Comparative Example 6 | Comparative Example 7 | Comparative Example 8 | Comparative Example 9 | Comparative Example 10 |
| | Resin | Resin 18 | Resin 18 | Resin 18 | Resin 18 | Resin 18 |
| Resin A | Type | A-11 | A-11 | A-11 | A-11 | A-11 |
| | (weight part) | 40 | 40 | 40 | 40 | 40 |

TABLE 8-continued

| | | Comparative Example No. | | | | |
|---|---|---|---|---|---|---|
| | | Comparative Example 6 | Comparative Example 7 | Comparative Example 8 | Comparative Example 9 | Comparative Example 10 |
| Resin B | Type | B-11 | B-11 | B-11 | B-11 | B-11 |
| | (weight part) | 60 | 60 | 60 | 60 | 60 |
| Tolylene diisocyanate (weight part) | | 2.3 | 2.3 | 2.3 | 2.3 | 2.3 |
| Addition condition while in urethane reaction | Wax type | — | — | — | — | — |
| | Amount added (weight %) | — | — | — | — | — |
| THF insoluble component (weight %) | | 9 | 9 | 9 | 9 | 9 |
| Tg (° C.) | | 61.4 | 61.4 | 61.4 | 61.4 | 61.4 |
| Acid value (KOHmg/g) | | 15.4 | 15.4 | 15.4 | 15.4 | 15.4 |
| GPC | Mw/Mn | 42.5 | 42.5 | 42.5 | 42.5 | 42.5 |
| | Peak molecular weight | 7000 | 7000 | 7000 | 7000 | 7000 |
| Addition condition while in toner kneading | Wax type | C-1 | C-1 | C-1 | C-1 | PP + C-1 |
| | Amount added (weight %) | 1 | 3 | 10 | 15 | 3 + 3 |
| Fixing properties | | 2 | 1 | 1 | 1 | 1 |
| Offset resistance | | 2 | 1 | 1 | 1 | 1 |
| Development durability | | 1 | 2 | 3 | 3 | 3 |
| Antiblocking properties | | 1 | 2 | 3 | 3 | 2 |

Comparative Example 8

A toner was produced in the same manner as in Comparative Example 6, except that the amount of an acid modified polyethylene wax (C-1) was changed to 10.0 weight parts. The results are shown in Table 8.

Comparative Example 9

A toner was produced in the same manner as in Comparative Example 6, except that 3.0 weight parts of a polypropylene wax (Hi-wax NP105; a product of Mitsui Chemicals, Inc.) was added, dispersed and mixed using a HENSCHEL MIXER; the resulting material was melt-kneaded at 120° C. using a twin screw extruder PCM-30 (a product of Ikegai Corporation) to obtain a toner composition in the bulk state. The results are shown in Table 8.

Comparative Example 10

A toner was produced in the same manner as in Comparative Example 6, except that 3.0 weight parts of a polypropylene wax (Hi-wax NP105; a product of Mitsui Chemicals, Inc.) was added, dispersed and mixed using a Henschel mixer; the resulting material was melt-kneaded at 120° C. using a twin screw extruder PCM-30 (a product of Ikegai Corporation) to obtain a toner composition in the bulk state. The results are shown in Table 8.

Then, the embodiments of the binder resin for a toner and the toner using a resin obtained by using a wax (c2) having a substituent of aromatic structure are exemplified below.

Production Example of a Wax having a Substituent of Aromatic Structure 1000 g of a polyethylene wax (C-11) having [□]=0.05 and a density of 951 $kg/m^3$ produced by the Fisher-Tropsch method was melted at 160° C., and 708 g of styrene and 110 g of di-t-butyl peroxide were dropped from a separate pipe over 8 hours. After that, the resulting mixture was further reacted at 160° C. for an hour, followed by degassing at 160° C. for an hour in vacuo of 10 mmHg to remove the volatile portion to obtain a graft modified wax (C-12). The graft modified wax (C-12) had a penetration of not more than 1 dmm, a melting viscosity of 200 mPa·S at 140° C. and a density of 981 $kg/m^3$.

The production of a polyester resin and urethane modified polyester resin of the present invention was conducted as follows. A polyester resin A-21 is described in concrete terms. The resin A-22 and the resin B-21 were produced in the same manner as the resin A-21 with the only difference in the conditions described in Table 9. The results are shown in Table 9, together with those of the resin A-21. In production of the resin A-22, a recycled PET was used for PET.

Production Example of a Polyester Resin (A-21)

A 5-liter, 4-necked flask was provided with a reflux condenser, a water-separating unit, a nitrogen gas inlet tube, a thermometer and a stirrer. Thereinto were fed 50 mole % of a recycled PET flake (weight-average molecular weight: 75,000) on the ethylene glycol unit in the PET, 22 mole % of Actcall KB300 (a product of Mitsui Takeda Chemicals, Inc.), 20 mole % of triethylene glycol, 8 mole % of trimethylolpropane, 36 mole % of terephthalic acid and 0.5 weight % of dibutyl tin oxide. The depolymerization and polycondensation were conducted at 240° C. with nitrogen being introduced into the flask. When the acid value of the reaction mixture reached a predetermined level, the reaction mixture was taken out of the flask, cooled, and ground to obtain a resin A-21.

TABLE 9

| | Resin | | |
|---|---|---|---|
| | A-21 | A-22 | B-21 |
| PET (mol %) | 50 | 59 | 66.5 |
| KB300 (mol %) | 22 | 25 | 28.5 |
| Diethylene glycol (mol %) | — | — | — |
| Triethylene glycol (mol %) | 20 | 6 | — |
| Trimethylolpropane (mol %) | 8 | 10 | 5 |
| Terephthalic acid (mol %) | 36 | 21 | 35.5 |
| Isophthalic acid (mol %) | — | — | — |
| Benzoic acid (mol %) | — | 15 | 14 |
| Isododecenyl succinic anhydride (mol %) | — | 6 | — |

The embodiments of the present invention are described specifically for a representative case, i.e., Example 17. Also for resins 22 and 23, i.e., Examples 18 to 21, resins and toners were obtained and evaluated in the same manner as in Example 17 with the only difference in the conditions described in Table 10 and Table 11. The proportions of resin, the ratios of tolylene diisocyanate added, the results of resin analysis and the properties of toner are shown in Table 10 and Table 11, together with those of Example 17.

Example 17

30 weight parts of resin A-21 as the resin (A), 70 weight parts of resin B-21 as the resin (B), and 2.1 weight parts of tolylene diisocyanate were kneaded and reacted in a twin screw extruder to obtain resin 21. The resin had a Tg of 62.3° C., an acid value of 17.8, an Mw/Mn of 22.6 as measured by GPC, and a peak molecular weight of 7,000.

100 weight parts of a resin 21, 6 weight parts of a carbon black (MA-100, a product of Mitsubishi Chemical Corporation), 1.5 weight parts of a charge control agent (BONTRON E-84, a product of Orient Chemical Instruments Inc.), 2.0 weight parts and 3.0 weight parts of a graft modified wax (C-12) were dispersed and mixed using a HENSCHEL MIXER; the resulting material was melt-kneaded at 120° C. using a twin screw extruder PCM-30 (a product of Ikegai Corporation) to obtain a toner composition in the bulk state. The resin composition after melt-kneading was coarsely ground using a hammer mill. The coarsely ground resin was finely ground using a jet grinder (IDS 2, a product of Nippon Pneumatic Co., Ltd.), followed by air classification, to obtain a toner fine powder having an average particle diameter of 10 micro-meters (5 micro-meters or less: 3 weight %, 20 micro-meters or more: 2 weight %). Then, to 100 weight parts of the toner, 0.5 weight parts of a hydrophobic silica (AEROSIL R-972, a product of Nippon Aerosil Co., Ltd.) was mixed using a HENSCHEL MIXER, feeding from the exterior to obtain toner particles. The toner particles were examined for the fixing properties, offset resistance, development durability and antiblocking properties.

TABLE 10

| | | Example No. | | | |
|---|---|---|---|---|---|
| | | Example 17 | Example 18 | Example 19 | Example 20 |
| | Resin | Resin 21 | Resin 22 | Resin 23 | Resin 24 |
| Resin A | Type | A-21 | A-22 | A-21 | A-21 |
| | (weight part) | 30 | 100 | 40 | 30 |
| Resin B | Type | B-21 | — | B-21 | B-21 |
| | (weight part) | 70 | — | 60 | 70 |
| Tolylene diisocyanate (weight part) | | 2.1 | 2.0 | 2.4 | 2.1 |
| THF insoluble portion (weight %) | | 10 | 5 | 8 | 10 |
| Tg (° C.) | | 62.3 | 61.2 | 61.0 | 62.3 |
| Acid value (KOHmg/g) | | 17.8 | 1.8 | 15.3 | 17.8 |
| GPC | Mw/Mn | 22.6 | 37.2 | 42.5 | 22.6 |
| | Peak molecular weight | 7000 | 7000 | 7000 | 7000 |
| Wax added | Wax type | C-12 | C-12 | C-12 | C-12 |
| | Amount added (weight %) | 3 | 3 | 3 | 1 |
| | Time of addition | 3 | 3 | 3 | 3 |
| Fixing properties | | 1 | 1 | 1 | 2 |
| Offset resistance | | 1 | 1 | 1 | 1 |
| Development durability | | 1 | 2 | 1 | 1 |
| Antiblocking properties | | 1 | 1 | 1 | 1 |

Time for Addition of a Graft Modified Polyethylene Wax
1: Addition after production of a resin
2: Addition in the urethane reaction
3: Addition in production of a toner Example 22

A toner was produced in the same manner as in Example 17, except that the method of adding the graft modified wax (C-12) was changed as follows. That is, 30 weight parts of resin A-21, 70 weight parts of resin B-21 and 3.0 weight parts of the graft modified polyethylene wax (C-12) were dissolved in 100 parts of xylene in the homogeneous state and mixed. A solvent was removed at 180° C. and 20 mmHg. 100 weight parts of the resin mixture obtained by removing the solvent and 2.0 weight parts of tolylene diisocyanate were kneaded and reacted in a twin screw extruder to obtain a resin 24. The resin had a Tg of 56.9° C., an acid value of 17.3, an Mw/Mn of 23.7 as measured by GPC, and a peak molecular weight of 7,000. The results are shown in Table 11.

value of 16.8, an Mw/Mn of 21.4 as measured by GPC, and a peak molecular weight of 7,000. The results are shown in Table 11.

Example 24

A toner was produced in the same manner as in Example 17, except that 3.0 weight parts of a polypropylene wax (Hi-wax NP105; a product of Mitsui Chemicals, Inc.) was added, dispersed and mixed using a HENSCHEL MIXER; the resulting material was melt-kneaded at 120° C. using a twin screw extruder PCM-30 (a product of Ikegai Corporation) to obtain a toner composition in the bulk state. The results are shown in Table 11.

Comparative Example 11

A toner was produced in the same manner as in Example 17, except that 3.0 weight parts of a polyethylene wax (C-11) was used instead of the graft modified wax (C-12). The results are shown in Table 12.

TABLE 11

| | | Example No. | | | |
|---|---|---|---|---|---|
| | | Example 21 | Example 22 | Example 23 | Example 24 |
| | Resin | Resin 25 | Resin 26 | Resin 27 | Resin 28 |
| Resin A | Type | A-21 | A-21 | A-21 | A-21 |
| | (weight part) | 30 | 30 | 30 | 30 |
| Resin B | Type | B-21 | B-21 | B-21 | B-21 |
| | (weight part) | 70 | 70 | 70 | 70 |
| Tolylene diisocyanate (weight part) | | 2.1 | 2.0 | 2.1 | 2.1 |
| THF insoluble portion (weight %) | | 10 | 12 | 12 | 15 |
| Tg (° C.) | | 62.3 | 56.9 | 57.8 | 62.3 |
| Acid value (KOHmg/g) | | 17.8 | 17.3 | 16.8 | 17.8 |
| GPC | Mw/Mn | 22.6 | 23.7 | 21.4 | 22.6 |
| | Peak molecular weight | 7000 | 7000 | 7000 | 7000 |
| Wax added | Wax type | C-12 | C-12 | C-12 | C-12 + PP |
| | Amount added (weight %) | 10 | 3 | 3 | 3 + 3 |
| | Time of addition | 3 | 1 | 2 | 3 |
| Fixing properties | | 1 | 1 | 1 | 1 |
| Offset resistance | | 1 | 1 | 1 | 1 |
| Development durability | | 2 | 1 | 1 | 1 |
| Antiblocking properties | | 2 | 1 | 1 | 1 |

Time for Addition of a Graft Modified Polyethylene Wax
1: Addition after production of a resin
2: Addition in the urethane reaction
3: Addition in production of a toner Example 23

A toner was produced in the same manner as in Example 17, except that the method of adding the graft modified wax (C-12) was changed as follows. That is, 30 weight parts of resin A-21, 70 weight parts of resin B-21 and 2.1 weight parts of tolylene diisocyanate were kneaded and reacted in a twin screw extruder. At this time, 3.0 weight parts of the graft modified wax (C-12) was added thereto to obtain a resin mixture (resin 25). The resin had a Tg of 57.8° C., an acid Comparative Example 12

A toner was produced in the same manner as in Example 18, except that 3.0 weight parts of a polyethylene wax (C-11) was used instead of the graft modified wax (C-12). The results are shown in Table 12.

Comparative Example 13

A toner was produced in the same manner as in Example 20, except that 3.0 weight parts of a polyethylene wax (C-11) was used instead of the graft modified wax (C-12). The results are shown in Table 12.

Comparative Example 14

A toner was produced in the same manner as in Example 21, except that 3.0 weight parts of a polyethylene wax (C-11) was used instead of the graft modified wax (C-12). The results are shown in Table 12.

Comparative Example 15

A toner was produced in the same manner as in Example 22, except that 3.0 weight parts of a polyethylene wax (C-11) was used instead of the graft modified wax (C-12) to obtain a resin 26. The results are shown in Table 12. The resin 26 had a Tg of 58.2° C., an acid value of 16.9, an Mw/Mn of 23.1 as measured by GPC, and a peak molecular weight of 7,000.

Comparative Example 16

A toner was produced in the same manner as in Example 23, except that 3.0 weight parts of a polyethylene wax (C-11) was used instead of the graft modified wax (C-12) to obtain a resin 27. The results are shown in Table 12. The resin 27 had a Tg of 58.8° C., an acid value of 17.1, an Mw/Mn of 22.8 as measured by GPC, and a peak molecular weight of 7,000.

Comparative Example 17

A toner was produced in the same manner as in Example 24, except that 3.0 weight parts of a polyethylene wax (C-11) was used instead of the graft modified wax (C-12). The results are shown in Table 12.

TABLE 12

| | | Comparative Example No. | | | | | | |
|---|---|---|---|---|---|---|---|---|
| | | Comparative Example 11 | Comparative Example 12 | Comparative Example 13 | Comparative Example 14 | Comparative Example 15 | Comparative Example 16 | Comparative Example 17 |
| Resin | | Resin 21 | Resin 22 | Resin 21 | Resin 21 | Resin 26 | Resin 27 | Resin 21 |
| Resin A | Type | A-21 | A-22 | A-21 | A-21 | A-21 | A-21 | A-21 |
| | (weight part) | 30 | 100 | 30 | 30 | 30 | 30 | 30 |
| Resin B | Type | B-21 | — | B-21 | B-21 | B-21 | B-21 | B-21 |
| | (weight part) | 70 | — | 70 | 70 | 70 | 70 | 70 |
| Tolylene diisocyanate (weight part) | | 2.1 | 2.0 | 2.1 | 2.1 | 2.0 | 2.1 | 2.1 |
| THF insoluble portion (weight %) | | 10 | 5 | 10 | 10 | 13 | 13 | 10 |
| Tg (° C.) | | 62.3 | 61.2 | 62.3 | 62.3 | 58.2 | 58.8 | 62.3 |
| Acid value (KOHmg/g) | | 17.8 | 1.8 | 17.8 | 17.8 | 16.9 | 17.1 | 17.8 |
| GPC | Mw/Mn | 22.6 | 37.2 | 22.6 | 22.6 | 23.1 | 22.8 | 22.6 |
| | Peak molecular weight | 7000 | 7000 | 7000 | 7000 | 7000 | 7000 | 7000 |
| Wax added | Wax type | C-11 | C-11 | C-11 | C-11 | C-11 | C-11 | C-11 + PP |
| | Amount added (weight %) | 3 | 3 | 1 | 10 | 3 | 3 | 3 + 3 |
| | Time of addition | 3 | 3 | 3 | 3 | 1 | 2 | 3 |
| Fixing properties | | 1 | 1 | 2 | 1 | 1 | 1 | 1 |
| Offset resistance | | 1 | 1 | 2 | 1 | 1 | 1 | 1 |
| Development durability | | 2 | 3 | 1 | 3 | 2 | 2 | 3 |
| Antiblocking properties | | 2 | 2 | 1 | 3 | 2 | 2 | 2 |

Time for Addition of a Graft Modified Polyethylene Wax
1: Addition after production of a resin
2: Addition in the urethane reaction
3: Addition in production of a toner The binder resin for a toner and the toner of the present invention comprises as described above; therefore, the resulting toner is superior in the fixing properties, offset resistance and development durability.

Thus, the binder resin for a toner and the toner obtained according to the present invention can correspond to the recently increasing needs of copiers and printers with a high speed, low-temperature fixing property and the like.

The invention claimed is:

1. A binder resin for a toner, wherein the binder resin is obtained by mixing a polyester resin and a polyisocyanate, wherein the polyester resin is obtained by reacting a polyethylene terephthalate (PET) and/or a polybutylene terephthalate (PBT), a polycarboxylic acid, a polyhydric alcohol, and a wax, wherein the wax has two or more hydroxyl groups, two or more carboxyl groups, or one or more hydroxyl group(s) and one or more carboxyl group(s), in its molecule.

2. An electrophotographic toner for static charge image development containing the binder resin for a toner as described in claim 1.

* * * * *